July 10, 1945.  E. W. FRANCK ET AL  2,380,037
PHONOGRAPH
Filed Aug. 25, 1943   2 Sheets-Sheet 1
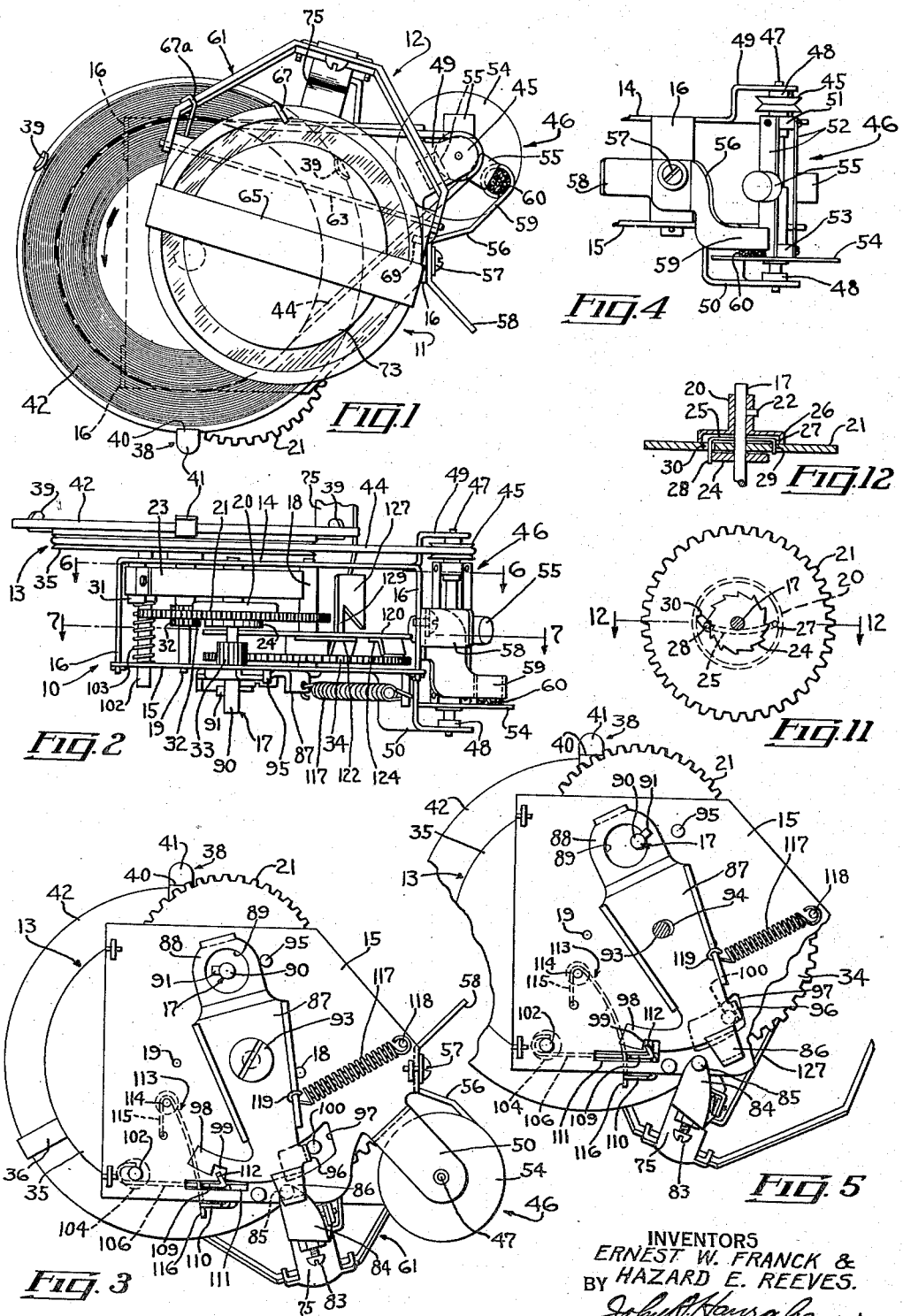
INVENTORS
ERNEST W. FRANCK &
BY HAZARD E. REEVES.
John P. Hanrahan
ATTORNEY July 10, 1945.　　　E. W. FRANCK ET AL　　　2,380,037
PHONOGRAPH
Filed Aug. 25, 1943　　　2 Sheets-Sheet 2
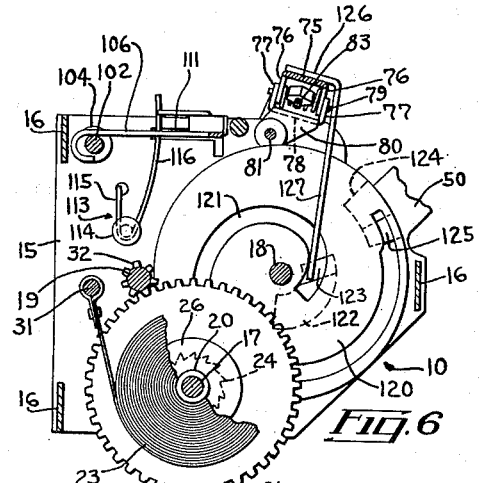
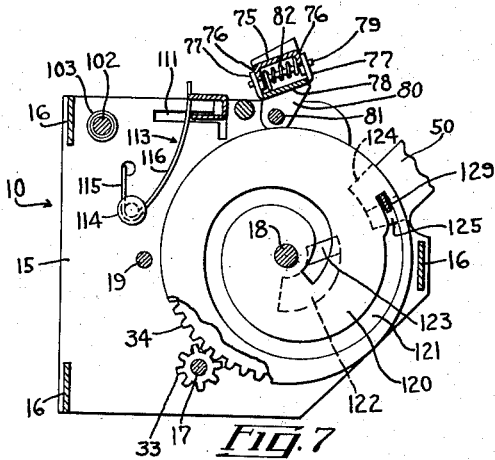
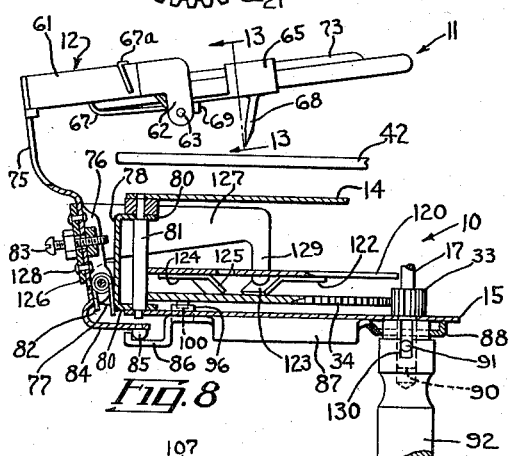
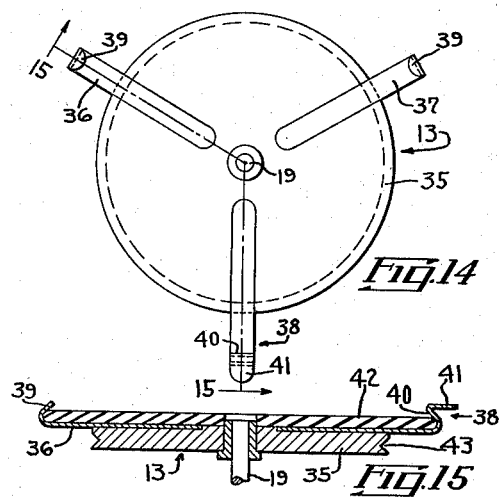
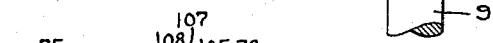
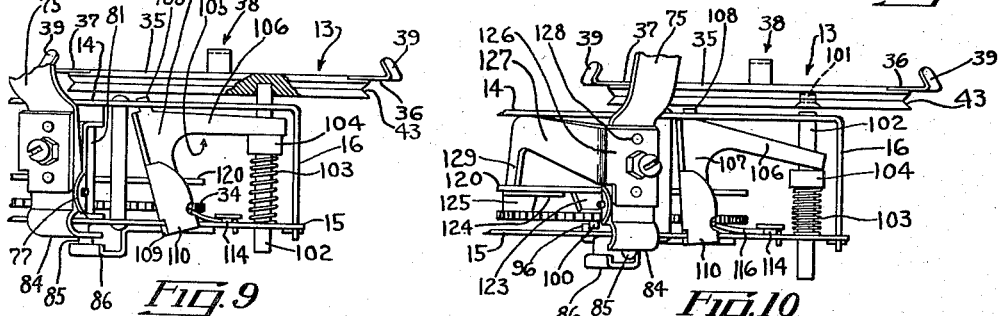
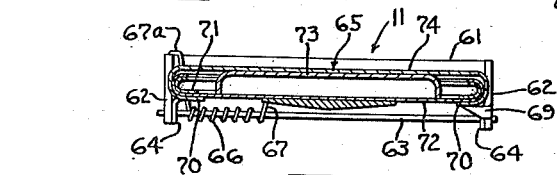
INVENTOR
ERNEST W. FRANCK &
BY HAZARD E. REEVES.
ATTORNEY Patented July 10, 1945

2,380,037

UNITED STATES PATENT OFFICE 2,380,037

PHONOGRAPH

Ernest W. Franck, Glenbrook, Conn., and Hazard E. Reeves, New York, N. Y.

Application August 25, 1943, Serial No. 499,886

11 Claims. (Cl. 274—14)

This invention relates to new and useful improvements in phonographs and has particular relation to a small compact phonograph especially adapted for use in advertising devices, dolls or the like, or for use alone as a toy.

The objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 1 is a top plan view of the phonograph of the invention;

Fig. 2 is a front elevational view thereof;

Fig. 3 is a bottom plan view thereof;

Fig. 4 is a detail elevational view showing a governor employed;

Fig. 5 is a view similar to Fig. 3 but showing the parts in other positions;

Fig. 6 is a sectional view taken as along the plane of the line 6—6 of Fig. 2 and showing the positions of the parts when the reproducer is in its innermost position, the governor being omitted;

Fig. 7 is a sectional view taken along the plane of the line 7—7 of Fig. 2 but with certain of the parts in outermost positions, the governor being omitted;

Fig. 8 is a detail sectional view showing the mounting of the reproducer supporting arm;

Fig. 9 is a rear elevational view showing a record support locking means employed;

Fig. 10 is a view similar to Fig. 9 but showing the locking means released;

Fig. 11 is a detail sectional view showing a ratchet mechanism used;

Fig. 12 is a detail sectional view taken as along the line 12—12 of Fig. 11;

Fig. 13 is a sectional view taken as along the plane of the line 13—13 of Fig. 8 and showing the reproducer mounting;

Fig. 14 is a plan view of the record support or turntable; and

Fig. 15 is a sectional view taken as along the plane of the line 15—15 of Fig. 14.

Referring in detail to the drawings the phonograph of the invention as herein disclosed includes essentially a spring motor generally designated 10, a reproducer generally designated 11, a reproducer support generally designated 12 and a record support or turntable generally designated 13. Motor 10 comprises upper and lower frame plates 14 and 15 secured together in spaced relation as by the members 16 which may be formed as parts of the upper frame plate, or otherwise, as desired. Mounted by and disposed between the plates 14 and 15 are a winding shaft 17, a cam shaft 18 and a turntable shaft 19.

Fixed to the shaft 17 is a spring drum 20 (see Figs. 11 and 12) located above the main driving gear 21 and having a hook or stud 22 to which the inner end of the motor spring 23 is secured. Secured to shaft 17 below the gear 21 is a ratchet wheel 24 with which is associated a pawl 25 in the form of a length of wire. Pawl 25 is U-shaped and its connecting portion is located within a cup-like portion 26 of the drum 20 while its legs 27 and 28 extend through openings 29 and 30 in the gear 21. Opening 30 is in the form of a slot and provides for the flexing of the pawl leg 28 relative to the teeth of the ratchet 24.

Gear 21 is not directly fixed to the shaft 17 and the arrangement is such that as said shaft is turned in a counter-clockwise direction to wind the spring 23 the gear 21 remains stationary. However the drum 20 moves with the shaft 17 during counter-clockwise turning thereof whereby the spring 23 is wound onto the drum. During such movement of the shaft the teeth of the ratchet wheel move over and brush aside the leg 28 of the pawl and obviously the leg 27 of the pawl is but an anchoring means for the pawl and is not in the path of movement of the teeth of the ratchet wheel.

As will later more fully appear when the spring 23 has been wound and the shaft 17 is released and the spring drives the shaft in a clockwise direction the teeth of the ratchet wheel 24 engage with the leg 28 of the pawl 25 whereby to carry the pawl with the ratchet wheel and thus, the pawl passing through the gear 21, the gear 21 is driven with and by the shaft 17. Here it is noted that the outer end of the spring 23 is anchored to a stud 31 fixed to the inner side of the upper frame plate 14 of the motor.

While unwinding the spring 23 drives the shaft 17 and the main driving gear 21 in a clockwise direction and the said gear meshing with a small diameter gear 32 on the turntable shaft 19 the latter and the turntable are driven in a counter-clockwise direction. Beneath the gear 21 a small diameter gear 33 is secured to the shaft 17 and meshes with a larger diameter gear 34 secured to the cam shaft 18. Due to this arrangement while the shaft 17 is being rotated in a counter-clockwise direction to wind the spring 23 the cam shaft 18 is being driven in a clockwise direction and while the spring is driving the shaft 17 in a clockwise direction the shaft 18 is being driven in a counter-clockwise direction.

As herein disclosed turntable 13 comprises a disc-like body portion 35 secured to the shaft 19 at the upper side of the motor frame plate 14 in any desired manner. Secured to the upper side of the body 35 and extending radially thereof are three equally spaced fingers designated 36, 37 and 38 and of which the fingers 36 and 37 are alike and have their outer end portions bent back upon themselves providing hook-like portions 39. Finger 38 also has an outer portion bent back upon itself providing a hook-like portion 40 and then the end of such finger is carried outwardly providing a lip or finger piece 41 the purpose of which will appear. A record 42 is secured on the turntable to rotate therewith and has its edges disposed under the hook-like portions 39 of the fingers 36 and 37 and the hook-like portion 40 of the finger 38.

In its peripheral edge portion the turntable body 35 is provided with a groove 43 receiving an endless driving belt 44, preferably a rubber band, trained over the pulley 45 of a governor means 46. The governor 46 includes a shaft 47 rotatably mounted in bearings 48 carried by brackets 49 and 50 supported from the upper and lower motor frame plates 14 and 15 respectively. Pulley 45 is secured to the shaft 47 as is a collar 51 to which is secured the upper ends of flat springs 52 the lower ends of which are secured to a collar 53 in turn fixed with respect to a disc 54. Weights 55 are secured to the intermediate portions of the springs 52 and obviously as the shaft 47 is rotated the weights will be flung outwardly and tend to draw the disc 54 toward the collar 51.

Associated with the disc 54 is a lever 56 pivoted intermediate its ends at 57 to one of the connecting members 16 whereby the lever has a handle portion 58 and a portion 59 carrying a friction pad 60 disposed over the disc 54. The pivot 57 is constructed to provide considerable resistance to any pivotal movement of the lever 56 whereby while the lever may be adjusted to dispose the pad 60 in the desired relation to the disc 54 to control the speed at which the motor drives the turntable there will be no casual movement of such lever either to move the pad 60 toward or from the disc. The driving of the governor from the turntable through the rubber band 44 places a burden on the turntable whereby it will be rotated at a constant speed and not with any jerks as might result from slight inaccuracies in the gears through which the turntable is driven.

The reproducer supporting means 12 includes a bifurcated member 61 between the arms of which the reproducer 11 is mounted. The arms of the member 61 toward their forward ends are each provided with a depending portion 62 and mounted by such portions is a rod or pivot means 63 passing also through ears 64 on a clip 65 holding the reproducer. A spring 66 is disposed about the pivot rod 63 and has one end 67 hooked over the rear edge of the reproducer and has its other end 67a hooked over an arm of the member 61. Pivot 63 is located rearwardly of the center of the reproducer and the tendency of the spring 66 is to rock the reproducer about the pivot in a direction to move the stylus 68 of the reproducer toward the record 42 but such movement is limited by an extension 69 formed on one of the depending portions 62 at the end of an arm of member 61 and located beneath the reproducer at the forward side of the pivot 63.

The reproducer is simply slipped into the clip 65 which has under portions 70 carrying the ears 64 and the reproducer as shown may comprise a ring-like frame member 71 and a diaphragm 72 supported by such frame. If desired a slightly concave metal disc 73 may be disposed on the upper side of the diaphragm and such disc is held with its open edge against the diaphragm to tension the latter. Disc 73 is located at the underside of the bridge or spanning portion 74 of the clip 65 and is held in place thereby.

From the above it will be understood that owing to the mounting disclosed the reproducer may yield outwardly or about the pivot 63 in a direction to carry the stylus 68 away from the record 42 but that the spring 66 constantly tends to move the reproducer in a direction to press the stylus toward the record, such movement being limited by the stop lug 69.

Bifurcated member 61 is secured to the upper end portion of a substantially vertically disposed arm 75 provided with ear-like portions 76 extending between ear-like portions 77 of a mounting piece 78. A pin 79 pivotally connects such ear-like portions whereby the arm 75 is horizontally pivoted and such member 78 at its upper and lower ends has ear-like portions 80 pivotally mounted by a rod 81 on the frame plates of the motor. It will now be clear that pin 79 mounts the arm 75 for movement to bring the reproducer toward and from the record 42 and the turntable 13. A spring 82 about pin 79 constantly tends to rock the arm 75 in a direction to move the reproducer toward the record. Through pivot 81 the member 78 is mounted for swinging movement and the arm 75 being attached to such member and carrying the reproducer it will be apparent that the latter is mounted for swinging movement back and forth across the record on the turntable 13.

A screw 83 is adjustable through the arm 75 toward the member 78 and serves to positively limit pivotal movement of the arm about the pin 79 in a direction to carry the reproducer toward the record 42. Below the pivot 79 arm 75 includes an inwardly directed extension 84 carrying at the underside of its inner end a lug or projection 85 cooperating with the rear end portion 86 of a lever 87 located against the underside of the motor.

The forward end portion 88 of the lever 87 has an opening 89 therethrough and the lower portion 90 of the winding shaft 17 extends through such opening and carries a stud 91 for cooperation with a winding key 92. A screw 93 passes through an elongated opening 94 in an intermediate portion of the lever 87 and may be threaded into the motor frame plate 15 and serves to pivotally mount the lever on the motor. When the lever is in its normal position wherein the machine is not playing, its forward end portion 88 is against a stop pin 95 and the end 90 of the winding shaft is centered in the opening 89 in the lever. The parts are shown in such described normal positions in Fig. 3.

Toward its rear end the lever 87 includes an inturned ear 96 extending through a slot 97 in the motor frame plate 15 and opposite said ear the lever is provided with a lateral extension 98 having a notch 99 in an edge thereof. A pin or projection 100 carried by the gear 34 is arranged to engage the ear 96 at its opposite sides at certain times to assist in shifting the lever 87 about its pivot 93 as will more fully appear.

In the underside of the body 35 of the turntable in predetermined relation to the record holding finger 38 is a socket 101 arranged to cooperate with a locking bolt 102. This bolt is guided by the motor frame plates 14 and 15 (see Figs. 9 and 10) and a coil spring 103 about the bolt and bearing at one end against the frame plate 15 and at its other end against a collar 104 on the bolt, serves to urge the bolt in a direction to project it through the frame plate 14. When the bolt is in projected position as in Fig. 9 its outer or upper end portion is in the socket 101 in the turntable and the latter is secured against rotation.

Means are provided for retracting the bolt to permit of rotation of the turntable and such means includes an L-shaped lever 105 an arm 106 of which encircles the bolt above the collar 104 thereof and the arm 107 of which includes a lug 108 passing through an opening in the frame plate 14 and a pair of lug-like portions 109 and 110 passing respectively through a slot 111 in the frame plate 15 and to the outer side of such plate. Lug 109 carries a bent extension 112 entering the notch 99 in the lateral extension 98 of lever 87.

A spring 113 is secured at 114 to the frame plate 15 and has an anchored arm 115 and an arm 116 pressing against the lower portions of the lever 105 whereby such spring is constantly tending to shift said lever from the position of Fig. 9 to that of Fig. 10 wherein the bolt 102 is in released position. However, as the extension 112 of the lever 105 enters the notch 99 in the extension 98 of the lever 87 it will be clear that movement of the lever 105 is dependent on movement of lever 87.

A coil spring 117 has one end anchored at 118 and the other end 119 of such spring is connected with the lever 87 in the rear of the pivot 93 thereof. Thus the spring is constantly tending to draw the lever 87 about its pivot to move it from the position of Fig. 3 to that of Fig. 5 and thus among other things to permit of movement of the lever 105 and the lock bolt 102 from the positions of Fig. 9 to those of Fig. 10.

Secured to the cam shaft 18 is a cam plate or disc 120 having a spiral cam slot 121 therein. Secured to the underside of the plate 120 at the inner end of the slot 121 is a member 122 having an inclined portion providing a cam 123 while at the outer end of the slot 121 and also secured to the under side of the plate 120 is a member 124 having an inclined portion 125. Inclined portions or cams 123 and 125 incline in opposite directions.

A portion 126 of an arm 127 is secured to the reproducer supporting arm 75 as by rivets or the like 128. Arm 127 extends forwardly between the plates 14 and 15 of the motor frame and at its forward or inner end includes a depending portion 129 entering the cam slot 121. Thus such end portion of the arm 127 is arranged to cooperate with the cam slot 121 and also with the inclined cam members or portions 123 and 125 as will appear.

In the operation of the device the parts being in the positions in which they are shown in Figs. 1, 2, 3, 6, 8 and 9 the winding key 92 is applied to the lower or outer end portion 90 of shaft 17, the slot 130 of the key receiving the stud 91 on such portion of the shaft whereby as the key is turned the shaft will turn with it. The key is turned in a counter-clockwise direction and owing to the presence of the pawl and ratchet means above described the main driving gear 21 and the turntable shaft 19 remain stationary while the small gear 33 on the winding shaft 17 drives the gear 34 on the cam shaft 18 whereby such shaft and the cam 120 thereon are rotated in a clockwise direction.

As cam 120 is rotated the inner wall of its slot 121 engages the portion 129 of the arm 127 and moves the same outwardly radially. The arm being attached to the reproducer arm 75 the latter is caused to swing on the pivot 81 whereby the reproducer 12 is carried from the end or center of the record 42 outwardly to position stylus 68 over the beginning or outer edge of the record. Initial movement of the gear 34 in the direction indicated moves the pin 100 away from the outer side of the lug 96 on the lever 87 and the spring 117 tries to rock the lever from the position in which it is shown in Fig. 3 to that in which it is shown in Fig. 5.

However, the key 92 being on the end 90 of the winding shaft and thus extending through the opening 89 in the lever the latter is held against any movement by the spring 117. As the winding of the motor proceeds the reproducer is held off the record since the lug 85 on the reproducer arm extension 84 is on the inner end portion 86 of the lever 87 and the arm 75 of the reproducer as well as the latter is held in the position of Fig. 8 wherein it is clear that the reproducer is spaced from the record 42.

When the spring 23 of the motor is wound the inclined cam 125 enters under the portion 129 of the lever 127 and serves to maintain said arm in the position of Fig. 8 with the arm 75 rocked about its pivot 79 and the reproducer off the record. At this time the lug 85 is still in engagement with the lever portion 86 and the lug or pin 100 has been carried by the gear 34 around to the inner side of the ear 96 and is pressing against said ear as shown in Fig. 5. This engagement between the lug 100 and the ear 96 constitutes a positive stop to prevent overwinding of the motor spring 23.

The motor being fully wound the key 92 is still on the shaft portion 90 and thus the lever 87 is held in the position of Fig. 3, being prevented from moving about the pivot 93. Such being the case there has been no movement of the lever 105 and so the locking bolt is in fully projected position and is preventing rotation of the turntable and thus is preventing unwinding of the motor spring 23.

Now the operator removes the key 92 from the lower end of the winding shaft. Immediately spring 117 acts to snap the lever 87 from the position of Fig. 3 to that of Fig. 5. This results in lever end portion 86 being moved from under the lug 85 on the extension 84 of the reproducer supporting arm 75 whereby the weight of the reproducer as augmented by the spring 82 is on the arm 127 which being held elevated by engagement of its portion 129 with the cam 125 acts to maintain the reproducer away from the record.

The movement of the lever 87 by the spring 117 also resulted in the arm 98 of such lever acting in cooperation with spring 113 to rock the L-shaped lever 105 from the position of Fig. 9 to that of Fig. 10. This movement is due to the fact that the lug 112 of the L-shaped lever is in the notch 99 of lever extension 98. As lever 87 is moved by the spring 117 it acts to rock the lever 105 whereby to have such lever and particularly the arm 106 thereof to act and retract the locking bolt 102 against the tendency of the spring 103 about the bolt.

As the locking bolt is thus retracted the motor starts to rotate the turntable 13 in a counter-clockwise direction and to rotate the cam plate 120 in the same direction carrying the cam 125 from under the end 129 of the lever or arm 127 thus lowering the latter and the reproducer to have the stylus 68 of the latter engage the record 42. It is noted that the inclined cam 125 acts with the arm 127 to gently lower the reproducer toward the record whereby to have the stylus gently engage the record.

Attention is directed to the fact that the slight delay between the starting of the motor and the engaging of the record by the stylus 68 (such delay being due to the gentle lowering of the stylus onto the record) gives the motor a chance to gain full speed before taking on the additional load resulting from the drag of the stylus on the record.

As the record is played its spiral groove feeds the stylus in toward the center of the record and at the end of the playing of the record portion 129 of arm 127 is picked up by the cam 123 rocking the reproducer supporting arm 75 about its pivot 79 whereby to elevate the reproducer off the record. This results in a slight elevating of the lug 85 on the arm 75 and immediately thereafter the lug or pin 100 on the gear 34 engages the outer side of the ear 96 and being driven by the motor (as gear 34 is driven) forces the lever 87 about its pivot 93 from the position of Fig. 5 to that of Fig. 3. Such movement of lever 87 places its end portion 86 under the lug 85 whereby the reproducer is supported off the record as at the start of the playing operation.

The last described movement of lever 87 also resulted in the extension or arm 98 of such lever acting through its notch 99 on the lug 112 rocking the L-shaped lever 105 back to the position of Fig. 9 from that of Fig. 10. When lever 105 is so rocked the bolt 102 is released to be moved by the spring 103 and as the socket 101 is next carried over the bolt the latter enters such socket and stops rotation of the turntable.

Now the parts are back in their normal positions, that is, the positions occupied by them while the machine is not in use and to again play the record it is but necessary to apply the key 92, wind the motor spring 23 and then move the key out of winding relation with the shaft 17. The machine will then play the record and at the end of the playing will stop with the reproducer raised off the record.

It is noted that the socket 101 bears a predetermined relation to the record securing finger 38. The arrangement is such that whenever the bolt 102 enters the socket 101 the finger 38 is located at the front of the machine. Finger 38 is adapted to have its portion 41 engaged and flexed downwardy by an operator whereby to have the finger release the edge of the record in order that it may be removed from the turntable and another record placed thereon. The turntable being in every case stopped in the same position with the finger 38 readily accessible it will be apparent that a record may be easily and quickly removed from the turntable and that another record may be easily and quickly placed on the turntable.

Having thus set forth the nature of our invention, what we claim is:

1. In a phonograph, a record support, a spring motor for driving said support, a reproducer for cooperation with a record on said support, a support for said reproducer, a cam shaft driven in opposite directions by said motor as the same is wound and unwound, means pivotally mounting said reproducer support for movement of the reproducer back and forth across a record on said record support, a cam on said cam shaft and comprising a plate having a spiral cam slot therein, an arm fixed to said reproducer support and entering said cam slot whereby the reproducer is moved from the end to the beginning of a record on said record support as said motor is wound, and cam means at the inner end of said cam slot and operable to engage said arm and move the reproducer away from the record at the end of the playing thereof.

2. In a phonograph, a record support, a spring motor for driving said support, a reproducer for cooperation with a record on said support, a support for said reproducer, a cam shaft driven in opposite directions by said motor as the same is wound and unwound, means mounting said reproducer support for movement of the reproducer back and forth across a record on said record support, a cam on said cam shaft and comprising a plate having a spiral slot therein, an arm fixed to said reproducer support and entering said cam slot whereby the reproducer is moved from the end to the beginning of a record on said record support as said motor is wound, cam means at the inner end of said cam slot and operable to engage said arm and move the reproducer away from the record at the end of the playing thereof, and other means operable to maintain said reproducer spaced from the record during winding of the motor.

3. In a phonograph, a record support, a spring motor for driving said support, a reproducer for cooperation with a record on said support, a support for said reproducer, a cam shaft driven in opposite directions by said motor as the same is wound and unwound, means mounting said reproducer support for movement of the reproducer back and forth across a record on said record support, a cam on said cam shaft and comprising a plate having a spiral cam slot therein, an arm fixed to said reproducer support and entering said cam slot whereby the reproducer is moved from the end to the beginning of a record on said record support as the motor is wound, winding means for said motor, and means held in place by the action of said winding means while the latter is in winding relation to said motor and acting to maintain the reproducer spaced from the record during winding of the motor.

4. In a phonograph, a record support, a motor for driving said support, a reproducer for cooperation with a record on said support, a reproducer supporting arm, means pivotally mounting said arm for movement to carry the reproducer toward and from a record on said record support, means pivotally mounting said arm for movement to carry the reproducer back and forth across a record on said support, motor operated means for rocking said arm on said first pivotal means to move the reproducer away from the record at the end of the playing thereof, and other means shiftable to a functioning position by said motor for supporting said arm in such position while the arm is moved on said second pivotal mounting to dispose the reproducer at the beginning of the record.

5. In a phonograph, a record support, a motor for driving said support, a reproducer for cooperation with a record on said support, a reproducer supporting arm, means mounting said arm for movement to carry the reproducer toward and from a record on said support, means mounting said arm for movement of the reproducer back and forth across a record on said support, and adjustable means positively limiting movement of said arm in a direction to carry the reproducer toward a record on said record support.

6. In a phonograph, a record support, a spring motor for driving said support, a reproducer for cooperation with a record on said support, a support for said reproducer, a cam shaft driven in opposite directions by said motor as the same is wound and unwound, means mounting said reproducer support for movement of the reproducer back and forth across a record on said record support, a cam on said cam shaft and comprising a plate having a spiral cam slot therein, an arm fixed to said reproducer support and entering said cam slot whereby the reproducer is moved from the end to the beginning of a record on said record support as the motor is wound, winding means for said motor, a lever held in place by the action of said winding means while the latter is in winding relation to said motor and acting to maintain the reproducer spaced from the record during winding of the motor, and a spring means mounted to move said lever out of place and permit said reproducer to move onto the record on movement of said winding means out of winding relation to the motor.

7. In a phonograph, a motor, a turntable connected to be driven by said motor, a reproducer for cooperation with a record on said turntable, a spring pressed locking bolt, said turntable having a socket therein receiving said bolt at the end of the playing of a record, means for winding said motor and movable to and from winding relation therewith, and means controlled by said winding means and operable to withdraw said bolt from said socket on movement of said winding means out of winding relation with the motor following winding thereof.

8. In a phonograph, a motor, a record support connected to be driven by said motor, a reproducer for cooperation with a record on said support, said support having a socket therein, a spring pressed locking bolt arranged to enter said socket at the end of the playing of a record, means for securing a record to said support, said means including a part shiftable to release a record from said support, and said part bearing a predetermined relation to said socket whereby the support is stopped with said shiftable part in a predetermined position.

9. In a phonograph, a motor, a record support connected to be driven by said motor, a reproducer for cooperation with a record on said support, said support having a socket therein, a spring pressed locking bolt arranged to enter said socket at the end of the playing of a record, means for securing a record on said support, said means including a part shiftable to release a record from said support, said part bearing a predetermined relation to said socket whereby the support is stopped with said shiftable part in a predetermined position, means for winding said motor and movable to and from winding relation therewith, and means controlled by said winding means and operable to withdraw said bolt from said socket on movement of said winding means out of winding relation with the motor following winding thereof.

10. In a phonograph, a record support, a spring motor for driving said support, said motor including upper and lower plates, brackets mounted on said upper and lower plates and offset above and below the respective plates, a governor mounted by said brackets and including a vertically disposed shaft having a pulley fixed thereto and a collar fixed thereto and a disc movable therealong, weighted spring means connecting said collar and disc, a lever pivoted intermediate its ends, a friction pad carried by said lever and disposed above said disc, said pivot of said lever including friction means whereby movement of the lever due to engagement of said disc with said pad is resisted, and a belt driving said pulley and thereby said governor direct from said record support.

11. In a phonograph, a record support, a spring motor for driving said support, a reproducer for cooperation with a record on said support, a support for said reproducer, a cam shaft driven in opposite directions by said motor as the same is wound and unwound, means mounting said reproducer support for movement of the reproducer back and forth across a record on said record support, a cam on said cam shaft and comprising a plate having a spiral slot therein, an arm fixed to said reproducer support and entering said cam slot whereby the reproducer is moved from the end to the beginning of a record on said record support as said motor is wound, cam means at the inner end of said cam slot and operable to engage said arm and move the reproducer away from the record at the end of the playing thereof, other means operable to maintain said reproducer spaced from the record during winding of the motor, and means at the outer end of said cam slot and operable to engage said arm when the reproducer has been returned to the beginning of the record for supporting the reproducer in spaced relation to the record and operable to gently lower the reproducer onto the record as said motor starts to unwind.

ERNEST W. FRANCK.
HAZARD E. REEVES.